United States Patent
Omae et al.

(10) Patent No.: US 7,602,718 B2
(45) Date of Patent: Oct. 13, 2009

(54) PACKET TRANSMISSION CONTROL APPARATUS, MOBILE NODE, CONTROL NODE, PACKET COMMUNICATION METHOD, AND PACKET COMMUNICATION SYSTEM

(75) Inventors: Koji Omae, Yokohama (JP); Hideaki Takahashi, Yokohama (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 844 days.

(21) Appl. No.: 10/427,951

(22) Filed: May 2, 2003

(65) Prior Publication Data

US 2004/0017775 A1    Jan. 29, 2004

(30) Foreign Application Priority Data

May 2, 2002  (JP) .......................... P2002-130947

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ...................................... 370/235; 370/231

(58) Field of Classification Search ................ 370/231, 370/5, 310, 2, 28, 352–6, 60, 381–3, 94, 370/395, 400, 408, 12, 15, 416, 29, 69, 473, 370/913, 230, 1, 235, 310.1, 310.2, 312, 370/328, 353, 354, 355, 356, 360, 382, 383, 370/394, 395.1, 395.5, 395.52, 395.54, 395.7, 370/395.71, 395.72, 412, 415, 429, 469; 455/95, 151, 412, 26; 709/232, 8; 710/11, 710/61, 52–54; 711/147

See application file for complete search history.

(56) References Cited

U.S. PATENT DOCUMENTS 5,386,415 A    1/1995  Ito et al.

(Continued)

FOREIGN PATENT DOCUMENTS

| EP | 0 596 645 | 5/1994 |
| EP | 0 687 090 A2 | 12/1995 |
| EP | 0 905 950 A1 | 3/1999 |
| GB | 2 282 474 | 4/1995 |

OTHER PUBLICATIONS

Mohamed Khalil, et al., "Buffer Management for Mobile IP", Internet Engineering Task Force, Internet-Draft, XP-015032551, Oct. 1999, pp. 1-20.

Govind Krishnamurthi, et al., "Buffer Management for Smooth Handovers in IPv6 draft-krishnamurthi-mobileip-buffer 6-01.txt", Mobileip Working Group, Internet Draft, XP-015031214, Mar. 1, 2001, pp. I-ii and 1-26.

(Continued)

*Primary Examiner*—Kevin C Harper
*Assistant Examiner*—Leon Andrews
(74) *Attorney, Agent, or Firm*—Oblon, Spivak, McClelland, Maier & Neustadt, L.L.P.

(57) ABSTRACT

A packet transmission control apparatus has a packet accumulating unit for buffering a plurality of packets. The apparatus further includes a transmission unit for and for transmitting, to a destination node, a front packet included in the plurality of packets buffered in the packet accumulating unit and for transmitting the remaining packets included in the plurality of packets to the destination node after a lapse of a time period starting from a time point of transmission of the front packet. The time period is equal or greater than a sum of predetermined downstream front packet processing time periods, the sum corresponding to a number of nodes the front packet passes through before reaching the destination node.

15 Claims, 7 Drawing Sheets

U.S. PATENT DOCUMENTS

| | | | |
|---|---|---|---|
| 5,613,067 A * | 3/1997 | Brady et al. | 709/225 |
| 5,640,599 A | 6/1997 | Roskowski et al. | |
| 5,857,082 A * | 1/1999 | Murdoch et al. | 710/310 |
| 5,859,835 A | 1/1999 | Varma et al. | |
| 5,920,568 A | 7/1999 | Kurita et al. | |
| 6,003,088 A | 12/1999 | Houston et al. | |
| 6,178,174 B1 * | 1/2001 | Franke et al. | 370/429 |
| 6,307,843 B1 | 10/2001 | Okanoue | |
| 6,510,144 B1 * | 1/2003 | Dommety et al. | 370/328 |
| 2001/0046223 A1 * | 11/2001 | Malki et al. | 370/338 |
| 2003/0053427 A1 * | 3/2003 | Kanda et al. | 370/328 |

OTHER PUBLICATIONS

Doo Seop Eom, et al., "Performance Improvement by Packet Buffering in Mobile IP Based Networks", IEICE Trans. Commun., vol. E83-B, No. 11, XP-001065367, Nov. 2000, pp. 2501-2512.

Charles E. Perkins, et al., "Optimized Smooth Handoffs in Mobile IP", Proceedings IEEE International Symposium on Computers and Communications, XP-002902009, Jul. 6, 1999, 7 pages.

* cited by examiner

| STATE | CONNECTION POINT OF LINK LAYER 14a | DEFAULT ROUTER | CAPABILITY OF REACHING CORRESPONDENT NODE |
|---|---|---|---|
| I | ACCESS ROUTER 32 | ACCESS ROUTER 32 | YES |
| II | NONE (SWITCHING) | ACCESS ROUTER 32 | NO |
| III | ACCESS ROUTER 33 | ACCESS ROUTER 32 | NO |
| IV | ACCESS ROUTER 33 | ACCESS ROUTER 33 | YES |

PACKET TRANSMISSION CONTROL APPARATUS, MOBILE NODE, CONTROL NODE, PACKET COMMUNICATION METHOD, AND PACKET COMMUNICATION SYSTEM

BACKGROUND OF THE INVENTION

1. Field of the Invention

The present invention relates to a packet transmission control apparatus, a mobile node, a control node, a packet communication method, and a packet communication system.

2. Related Background Art

Conventionally, a packet communication system has been put into practical use in which a packet is transmitted from a source node to a destination node through a plurality of routers. Among the plurality of routers existing on a pathway between the nodes, there may be a router having an unresolved media access control (MAC) address of a router to which the packet addressed to the destination node is to be routed (forwarded).

The router having the unresolved MAC address is a router among the routers through which a packet passes when transmitted to the destination node, and this router does not hold a MAC address of a successive routing destination of the packet.

The router having the unresolved MAC address for the successive routing destination (which will be tentatively referred to as the "router A") needs to recognize the MAC address of the router which corresponds to the successive routing destination (which will be tentatively referred to as the "router B") by the use of an address resolution protocol (ARP). In this event, the router A broadcasts an ARP request packet having an internet protocol (IP) address of the router B to a link to which the router B is connected. The broadcasted ARP request packet is received by all nodes on the link, and the contents of the ARP request packet are analyzed. Of the nodes on the link, the router B confirms that the router B itself is the object of the ARP request, and transmits to the router A an ARP response packet having the MAC address of the router B. Upon receipt of this ARP response, the router A obtains the MAC address of the router B.

The above-described operations by the router A will be referred to as the "MAC address resolution". Meanwhile, a "time period necessary for resolving the MAC address" is a time period consumed from the time point at which the ARP request packet is transmitted by the router A until the router A receives and analyzes the ARP response packet and then obtains the MAC address of the router B.

If a plurality of packets addressed to the same transmittee reach the router having the unresolved MAC address at an interval within the time period necessary for resolving the MAC address (which is normally several milliseconds), there is a concern regarding the following problem.

Specifically, if the plurality of packets reach the router at a high frequency before the router resolves the MAC address upon receipt of the packets addressed to a destination host, the respective packets are replaced by the subsequent packets because a buffering area is limited. As a result, the packets except the one that reach the router last may be discarded. Discarding the packets in this manner may result in an occurrence of a packet receiving failure by the destination host (a packet loss).

SUMMARY OF THE INVENTION

The present invention has been made in consideration of the foregoing problem. It is an object of the present invention to provide a packet transmission control apparatus, a mobile node, a control node, a packet communication method, and a packet communication system, which are capable of certainly delivering a plurality of packets to a destination.

To address the problem explained earlier, a packet transmission control apparatus according to the present invention is a packet transmission control apparatus which sequentially transmits a plurality of packets addressed to a destination node (including various routers) at an interval within a first time period. Here, the packet transmission control apparatus includes: packet accumulating means for buffering (temporarily retaining) the plurality of packets; and packet transmission controlling means for transmitting to the destination node a front packet included in the plurality of packets buffered in the packet accumulating means and for transmitting the remaining packet (a packet or packets other than the front packet) included in the plurality of packets to the destination node after the lapse of a second time period starting from a time point when the front packet was transmitted.

A packet communication method according to the present invention is a packet communication method for allowing a packet transmission control apparatus to sequentially transmit a plurality of packets addressed to a destination node at an interval within a first time period. Here, the method includes: a front packet transmitting step which allows the packet transmission control apparatus to transmit, to the destination node, a front packet included in the plurality of packets buffered in packet accumulating means; and a subsequent packet transmitting step which allows the packet transmission control apparatus to transmit the remaining packet included in the plurality of packets to the destination node after the lapse of a second time period starting from a time point when the front packet was transmitted in the front packet transmitting step.

According to these aspects of the invention, when it is assumed that the plurality of packets addressed to the destination node are sequentially transmitted at the interval within the first time period, the front packet included in the buffered plurality of packets is first transmitted to the destination node, and the remaining packet is transmitted to the destination node after the lapse of the second time period starting from the time point when the front packet is transmitted.

In this way, it is possible to suppress buffering of packets by the node which receives the front packet addressed to the destination node before the node resolves the MAC address. In other words, the remaining packet is received by the node after resolution processing of the MAC address based on the front packet is completed. Therefore, the respective packets are not replaced by the subsequent packets or discarded instead thereof. As a result, packet losses are reduced and the packet transmission control apparatus can certainly deliver the plurality of packets to the transmittee.

In the packet transmission control apparatus according to the present invention, it is preferable that the first time period is a time period necessary for a node for relaying the packet transmitted by the packet transmission control apparatus, to resolve a MAC address of a routing destination of the packet.

In the packet communication method according to the present invention, it is preferable that the first time period is a time period necessary for a node for relaying the packet transmitted by the packet transmission control apparatus, to resolve a MAC address of a routing destination of the packet.

The first time period is equivalent to the time period necessary for the node for relaying the packet transmitted by the packet transmission control apparatus, to resolve the MAC address of the routing destination of the packet (such a time period will be referred to as the "address resolution time period"). For example, the first time period is equivalent to a time period necessary for an apparatus, which is connected directly to the packet transmission control apparatus as a subsequent node, to resolve a MAC address of a successive node that is the routing destination of the packet.

Replacement of the packet by the subsequent packet constitutes an impediment to certain transmission of the packet which is the object of the present invention. Occurrence of such replacement is attributable to an aspect that the subsequent packet catches up with the precedent packet while the MAC address of the routing destination of the precedent packet is unresolved. Here, the subsequent packet catches up with the precedent packet in the case when a transmission interval of the respective packets is shorter than the above-described address resolution time period. Accordingly, by adopting the packet transmission control technique of the present invention only to the above-described case, it is possible to achieve efficient packet transmission while reducing redundant time elapse that occurs when the subsequent packet is waiting on standby for transmission.

In the packet transmission control apparatus according to the present invention, it is more preferable that the second time period is a time period for all nodes, which are to resolve the MAC address require to resolve the Mac address. These nodes are among the nodes which the plurality of packets transmitted from the packet transmission control apparatus pass through before reaching the destination node.

In the packet communication method according to the present invention, it is more preferable that the second time period is a time period for all nodes which are to resolve the MAC address, to resolve the MAC address. These nodes are among the nodes which the plurality of packets transmitted from the packet transmission control apparatus pass through before reaching the destination node.

According to these aspects of the invention, the second time period is the time period for all nodes which are to resolve the MAC address, to resolve the MAC address. These nodes are among the nodes which the plurality of packets transmitted from the packet transmission control apparatus pass through before reaching the destination node. In this way, by the time point at which the remaining packet is transmitted from the packet transmission control apparatus, all the nodes which are to resolve the MAC address and through which the remaining packet passes before reaching the destination node will have completed the resolution processing of the MAC address. The front packet and the remaining packet trace the same pathway to reach the targeted node. However, in this event, the remaining packet never catches up with the front packet. Therefore, the certainty of the plurality of packets reaching the desired destination is enhanced.

It is also possible to construct and utilize a packet communication system which includes the above-described packet transmission control apparatus, and the destination node for receiving the plurality of packets transmitted from the packet transmission control apparatus.

A mobile node (for example, a mobile station such as a mobile telephone) according to the present invention is a mobile node including a link layer for switching an access router to be connected, and an internet protocol (IP) layer for controlling to transmit a plurality of packets sequentially to a destination node through the access router at an interval within a first time period. Here, the IP layer includes a buffer area in which the plurality of packets are buffered in a disconnection period when the mobile node switches the access router to be connected. Moreover, the IP layer performs control of transmitting a front packet included in the plurality of packets buffered in the buffer area to the switched access router. The IP layer also controls transmission of the remaining packet included in the plurality of packets to the switched access router after a lapse of a second time period starting from a time point when the front packet was transmitted.

The link layer and the IP layer represent definitions of standard function modules for respective layers resulted from classifying communication functions expected in respective nodes into a layered structure based on a design rule (such as the open systems interconnection (OSI)) for a network structure to achieve communications between different nodes.

A packet communication method according to the present invention is a packet communication method for allowing a mobile node to switch an access router to be connected and to sequentially transmit a plurality of packets to a destination node through the access router at an interval within a first time period. Here, the method includes: a front packet transmitting step of transmitting, to a switched access router, a front packet included in the plurality of packets buffered in packet accumulating means in a disconnection period when the mobile node switches the access router to be connected; and a subsequent packet transmitting step of allowing the mobile node to transmit the remaining packet included in the plurality of packets to the switched access router after a lapse of a second time period starting from a time point when the front packet was transmitted in the front packet transmitting step.

The mobile node buffers the packet to be transmitted to the access router into the buffer area in the disconnection period during a handover for switching the access router to be connected. These aspects of the invention are based on the assumption that the mobile node sequentially transmits the plurality of packets addressed to the destination node through the access router at the interval within the first time period. According to these aspects of the invention, the front packet included in the plurality of packets buffered by the mobile node is first transmitted to the switched access router. After a lapse of the second time period starting from the time point when the front packet was transmitted, the remaining packet is transmitted to the switched access router.

In this way, it is possible to suppress buffering of plenty of packets by the switched access router, which has received the front packet addressed to the destination node, beyond the processing capability of the access router for resolving the MAC address. In other words, the remaining packet is received by the access router after resolution processing of the MAC address based on the front packet is completed. Therefore, the respective packets are not replaced by the subsequent packets or discarded. As a result, packet losses are reduced and the mobile node can certainly deliver the plurality of packets to the destination.

In the mobile node according to the present invention, it is preferable that the first time period is a time period necessary for any of the switched access router and a node for relaying the packet transmitted by the mobile node, to resolve a MAC address of a routing destination of the packet.

In the packet communication method according to the present invention, it is preferable that the first time period is a time period necessary for any of the switched access router and a node for relaying the packet transmitted by the mobile node, to resolve a MAC address of a routing destination of the packet.

The first time period is equivalent to the address resolution time period by the switched access router, concerning the routing destination of the packet. For example, the first time period is equivalent to the time period necessary for either the switched access router, which is connected directly to the mobile node as a subsequent node, or a node that relays the packet transmitted by the mobile node, to resolve a MAC address of a successive node which is the routing destination of the packet.

Replacement of the packet by the subsequent packet constitutes an impediment to certain transmission of the packet which is the object of the present invention. Occurrence of such replacement is attributable to an aspect that the subsequent packet catches up with the precedent packet while the MAC address of the routing destination of the precedent packet is unresolved. Here, the subsequent packet catches up with the precedent packet in the case when a transmission interval of the respective packets is shorter than the address resolution time period described earlier. Accordingly, by adopting the packet transmission control technique of the present invention only to the above-described case, it is possible to achieve efficient packet transmission while reducing a redundant time elapse that occurs when the subsequent packet is waiting on standby for transmission.

In the mobile node according to the present invention, it is more preferable that the second time period is a time period for all nodes, which are to resolve the MAC address to resolve the MAC address. These nodes are among the nodes which the plurality of packets transmitted from the mobile node pass through before reaching the destination node.

In the packet communication method according to the present invention, it is more preferable that the second time period is a time period for all nodes, which are to resolve the MAC address, to resolve the MAC address. These nodes are among the nodes which the plurality of packets transmitted from the mobile node pass through before reaching the destination node.

According to these aspects of the invention, the second time period is the time period for all nodes (including the switched access router), which are to resolve the MAC address, to resolve the MAC address. These nodes are among the nodes which the plurality of packets transmitted from the mobile node pass through before reaching the destination node. In this way, by the time point at which the remaining packet are transmitted from the mobile node, all the nodes which are to resolve the MAC address and through which the remaining packet passes before reaching the destination node will have completed the resolution processing of the MAC address. The front packet and the remaining packet trace the same pathway to reach the targeted node. However, in this event, the remaining packet never catches up with the front packet. Therefore, the mobile node can deliver the plurality of packets to a desired transmittee more certainly.

It is also possible to construct and utilize a packet communication system which includes the above-described mobile node, and the destination node for receiving the plurality of packets transmitted from the mobile node through the access router.

A control node according to the present invention is a control node including an internet protocol (IP) layer for controlling sequential transmission of a plurality of packets to a mobile node through a router at an interval within a first time period. Here, the IP layer includes a buffer area in which the plurality of packets are buffered in response to a buffering request from the mobile node. The IP layer controls transmission of a front packet included in the plurality of packets buffered in the buffer area, to the mobile node in response to a buffering release request from the mobile node. The IP layer also controls transmission of the remaining packet included in the plurality of packets, to the mobile node after a lapse of a second time period starting from a time point of transmission of the front packet.

A packet communication method according to the present invention is a packet communication method for allowing a control node to sequentially transmit a plurality of packets to a mobile node that switches an access router to be connected thereto, through a router at an interval within a first time period. Here, the method includes: a front packet transmitting step which allows the control node to transmit, to the mobile node, a front packet included in the plurality of packets buffered in packet accumulating means in response to a buffering request from the mobile node, upon receipt of a buffering release request from the mobile node; and a subsequent packet transmitting step which allows the control node to transmit the remaining packet included in the plurality of packets to the mobile node after a lapse of a second time period starting from a time point when the front packet was transmitted in the front packet transmitting step.

The control node (such as a mobility agent that is connected to a regional mobile network comprising a plurality of routers) buffers the packet to be transmitted to the mobile node into the buffer area, in response to the buffering request transmitted due to a handover which allows the mobile node to switch the access router to be connected thereto. These aspects of the invention is based on an assumption that the control node sequentially transmits the plurality of packets addressed to the mobile node through the router, at the interval within the first time period. According to these aspects of the invention, the front packet included in the plurality of packets buffered by the control node is firstly transmitted to the mobile node. After a lapse of the second time period starting from the time point at which the front packet is transmitted, the remaining packet is transmitted to the mobile node.

In this way, it is possible to suppress buffering of packets in the router, which receives the front packet addressed to the mobile node, beyond a processing capability of the router for resolving the MAC address. In other words, the remaining packet is received by the router after resolution processing of the MAC address based on the front packet is completed. Therefore, the respective packets are not replaced by the subsequent packets or discarded. As a result, packet losses are reduced and the control node can certainly deliver the plurality of packets to the destination.

In the control node according to the present invention, it is preferable that the first time period is a time period necessary for a node (including the router), which relays the packet transmitted by the control node, to resolve a MAC address of a routing destination of the packet.

In the packet communication method according to the present invention, it is preferable that the first time period is a time period necessary for a node, which relays the packet transmitted by the control node, to resolve a MAC address of a routing destination of the packet.

The first time period is equivalent to the address resolution time period by the router concerning the routing destination of the packet. For example, the first time period is equivalent to the time period necessary for a router, which is connected directly to the control node as a node subsequent to the control node, to resolve a MAC address of a successive node that is the routing destination of the packet.

Replacement of the packet by the subsequent packet constitutes an impediment to transmission of the packet, which is an object of the present invention. Occurrence of such replacement is attributable to an aspect that the subsequent packet catches up with the precedent packet while the MAC address of the routing destination of the precedent packet is unresolved. Here, the subsequent packet catches up with the precedent packet in the case when a transmission interval of the respective packets is shorter than the address resolution time period described earlier. Accordingly, by adopting the packet transmission control technique of the present invention only to the above-described case, it is possible to achieve efficient packet transmission while reducing redundant time elapse that occurs when the subsequent packet is waiting on standby for transmission.

In the control node according to the present invention, it is more preferable that the second time period is a time period that all the nodes which are to resolve the MAC address, resolve the MAC address. These nodes are among the nodes which the plurality of packets transmitted from the control node pass through before reaching the mobile node.

In the packet communication method according to the present invention, it is more preferable that the second time period is a time period that all the nodes (including the switched access router) which are to resolve the MAC address, resolve the MAC address. These nodes are among the nodes which the plurality of packets transmitted from the control node pass through before reaching the mobile node.

According to these aspects of the invention, the second time period is the time period necessary for all nodes (including the relay router and the access router), which are to resolve the MAC address, to resolve MAC address. These nodes are among the nodes which the plurality of packets transmitted from the control node pass through before reaching the mobile node. In this way, at the time point at which the remaining packet is transmitted from the control node, all the nodes which are to resolve the MAC address and through which the remaining packet passes before reaching the mobile node will have completed the resolution processing of the MAC address. The front packet and the remaining packet trace the same pathway to reach the targeted node. However, in this event, the remaining packet never catches up with the front packet. Therefore, the certainty the plurality of packets from the mobile node reaching the desired destination is enhanced.

It is also possible to construct and utilize a packet communication system which includes the above-described control node, and the mobile node for receiving the plurality of packets transmitted from the control node through the router.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

First Embodiment

A first embodiment of the present invention is described in detail below with reference to the accompanying drawings.

Figure 1:
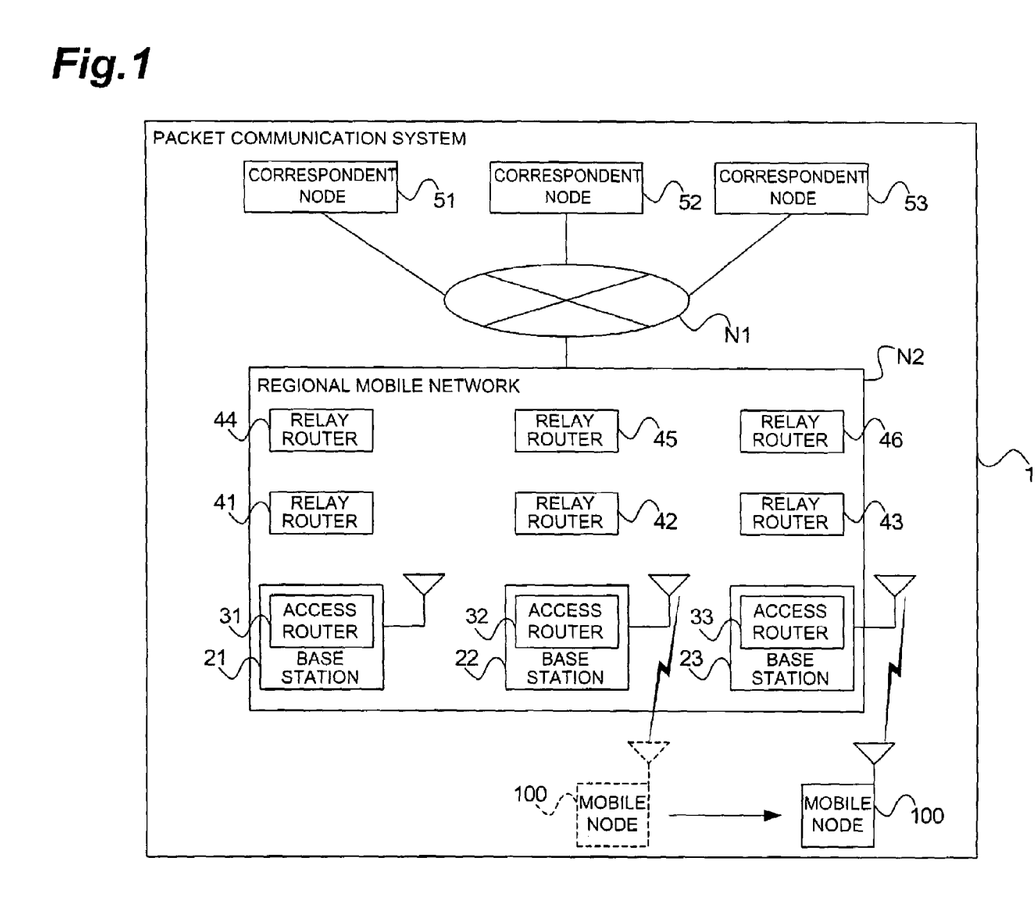
FIG. 1 is a block diagram showing an overall configuration of a packet communication system according to a first embodiment.

As a premise of description, this embodiment is based on an assumption of the case where the packet transmission control technique according to the present invention is adopted to a mobile node. FIG. 1 is a block diagram showing an overall configuration of a packet communication system according to the first embodiment of the present invention. A packet communication system 1 shown in FIG. 1 is configured by including a mobile node (MN) 100 such as a mobile telephone, a regional mobile network N2, a known backbone network N1, and a plurality of correspondent nodes (CN) 51, 52 and 53.

Here, this packet communication system is constructed in accordance with the modes including the regional registrations, the hierarchical mobile IP, and the like, which are proposed by the Internet Engineering Task Force (IETF).

The regional mobile network N2 is constituted by wire connection of access routers (AR) 31, 32, and 33 provided in a plurality of base stations 21, 22, and 23, and, relay routers 41 to 46 connected directly or indirectly to these access routers 31 to 33. Moreover, the regional mobile network N2 is connected to the correspondent nodes 51 to 53 by wires through the backbone network N1.

The mobile node 100 (corresponding to a packet transmission control apparatus) is wirelessly connected to anyone of the access routers 31 to 33 depending on the location of mobile node 100, and is handed over among the access routers while transmitting packets to the plurality of correspondent nodes 51, 52, and 53. The access routers 31 to 33 and the relay routers 41 to 46 (hereinafter collectively referred to as the "routers") execute resolution processing of a media access control (MAC) address in order to specify a router as a subsequent routing destination of the packets. Here, for each of the relay routers and the access routers through which the packets pass after being transmitted until received, a time period required to resolve the MAC address of the node, which is the subsequent routing destination of the packets, is preferably set to about 5 ms (corresponding to a first time period).

The packets which are transmitted from the mobile node 100 to any one of the correspondent nodes 51 to 53 are routed to the backbone network N1 through one of the access routers connected to the mobile node when the packets are transmitted and at least two of the relay routers. In this event, if there is no router having an unresolved MAC address after the backbone network N1, then the packets are routed through up to three routers having an unresolved MAC addresses before reaching a desired destination node. Therefore, as a transmission standby time period (corresponding to a second time period), 5 ms×3=15 ms is preferably preset on the mobile node 100.

Figure 2:
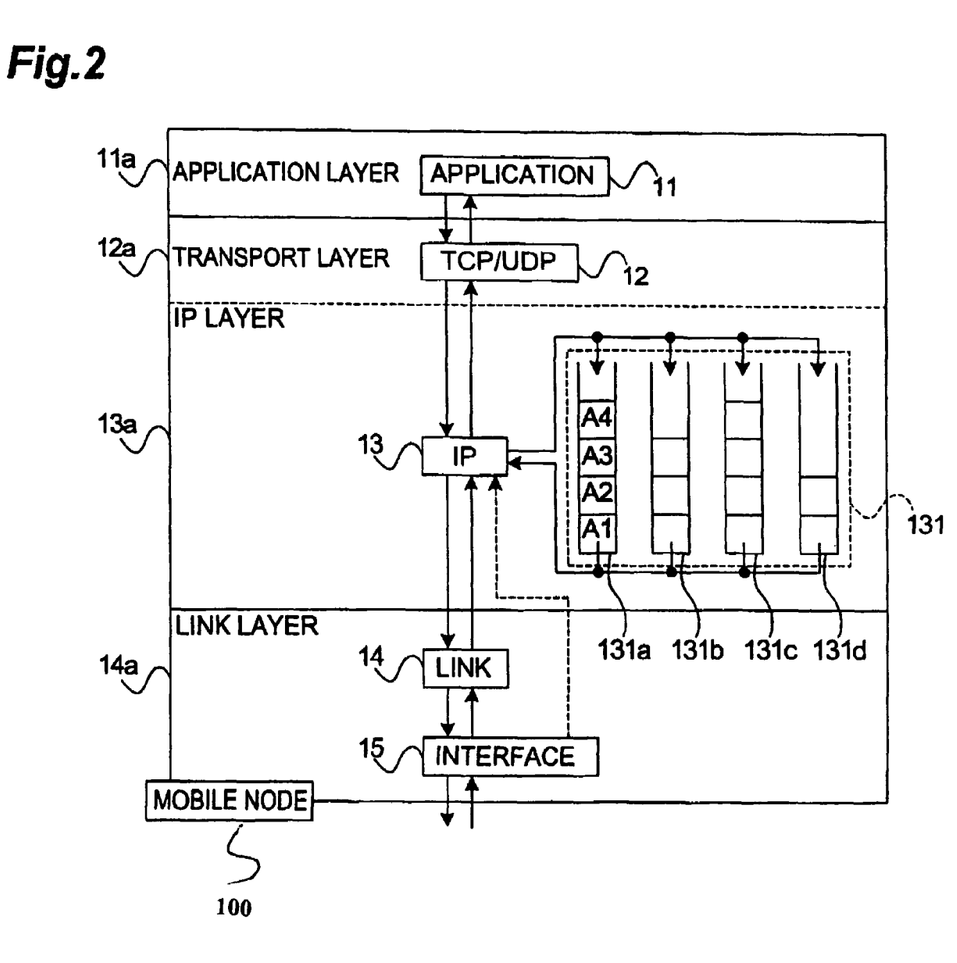
FIG. 2 is a conceptual view for explaining a functional constitution and operations of a mobile node according to the first embodiment.

FIG. 2 is a conceptual view for explaining a functional constitution and operations of the mobile node.

As shown in FIG. 2, the mobile node 100 includes an application 11 in an application layer 11a, a transmission control protocol (TCP)/user datagram protocol (UDP) 12 in a transport layer 12a, a internet protocol (IP) (corresponding to packet transmission controlling means) 13 having a buffer area 131 (corresponding to packet accumulating means) in an internet protocol (IP) layer 13a, a link 14 and an interface 15 in a link layer 14a.

Data transmitted from the application 11 to another node is transmitted sequentially through the TCP/UDP 12, the IP 13, the link 14, and the interface 15. Meanwhile, data transmitted from the other node to the application 11 is received sequentially through the interface 15, the link 14, the IP 13, and the TCP/UDP 12.

When a connection point is switched from the access router 32 to the access router 33, of FIG. 1, a buffering request is outputted from the interface 15 to the IP 13. When the buffering request is inputted to the IP 13, the packets are buffered in the buffer area 131. To be more precise, the packet is buffered in queues 131a to 131d which constitute a data retention area prepared for respective destination addresses of the packets.

The IP 13 releases buffering at a time point when a default router is changed by a router advertisement (RA) received from the access router 33 of FIG. 1. When buffering is released, the IP 13 hands over, to the link layer 14a, only one front packet (such as a packet A1 in the queue 131a) out of the packets buffered in each queue. Then, after 15 ms have passed, the IP 13 hands over the remaining packets retained in each queue to the link layer 14a.

Figure 3:
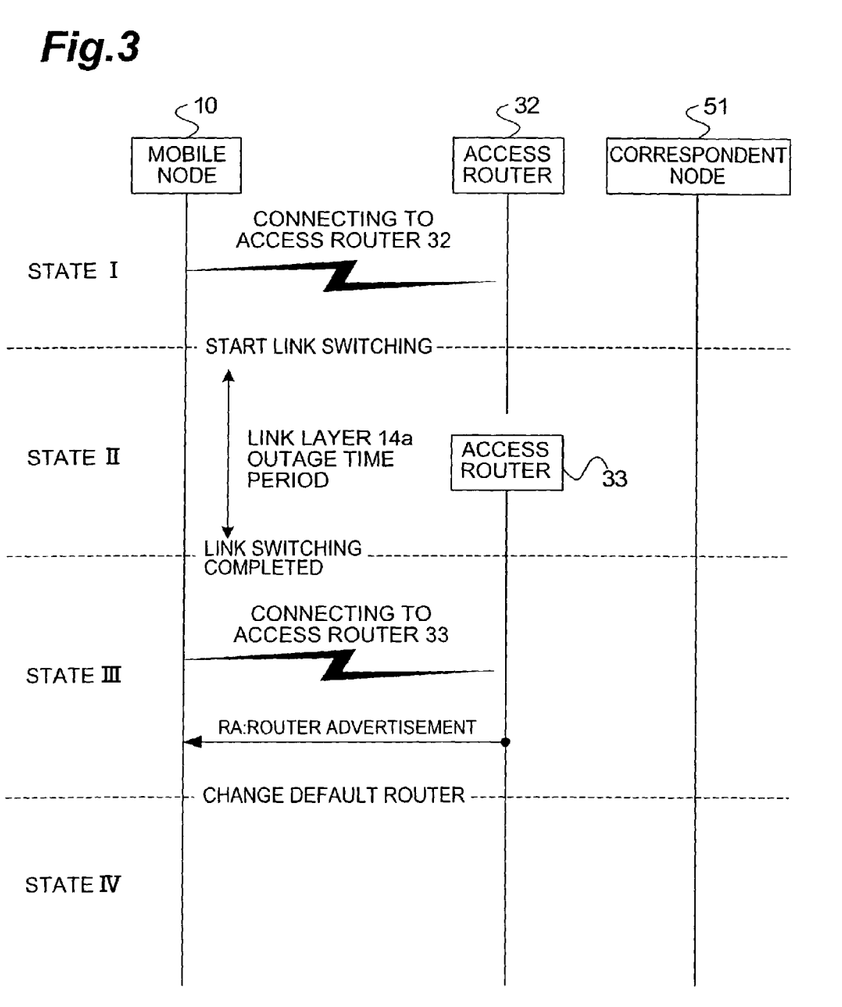
FIG. 3 is a view showing state transition in the event of a handover of the mobile node in the first embodiment.
Figure 4:
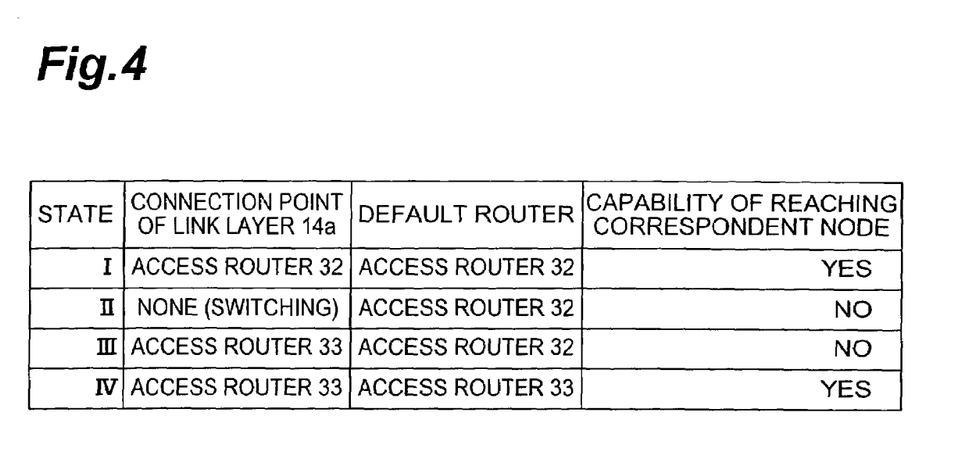
FIG. 4 is a table showing correlation between a connection point of a link layer and a default router in different states, respectively.

FIG. 3 is a view showing state transition in the event of a handover of the mobile node 100 shown in FIG. 1. The state transition associated with the handover of the mobile node 100 is categorized into four states (states I to IV) as shown in FIG. 3. Meanwhile, FIG. 4 is a table showing correlation between the connection point of the link layer 14a and the default router in each of the states.

The state I is a state where the link layer 14a of the mobile node 100 of FIG. 1 is connected to the access router 32, and the default router is the access router 32. The state II is a state where the link layer 14a of the mobile node 100 of FIG. 1 is being switched from the access router 32 to the access router 33 (in a link layer outage time period) and the default router is still the access router 32.

The state III is a state where the link layer 14a of the mobile node 100 of FIG. 1 is connected to the access router 33 and the access router 32 remains the default router. The state III is continued until the mobile node 100 receives the RA of the access router 33 and thereby changes the default router from the access router 32 to the access router 33. The state IV is a state after the mobile node 100 of FIG. 1 received the RA of the access router 33 and thereby changed the default router from the access router 32 to the access router 33. In this event, each of the connection point of the link layer 14a and the default router is the access router 33.

When the connection point of the link layer 14a and the default router coincide with each other (in the state I and the state IV), the packets transmitted from the mobile node 100 of FIG. 1 addressed to the correspondent node 51 of FIG. 1 that is the destination thereof are received by the corresponding access router (that is, the access router 32 in the state I or the access router 33 in the state IV). Thereafter, the received packets are routed to the correspondent node 51 of FIG. 1.

On the contrary, when the connection point of the link layer 14a and the default router do not coincide with each other (in the state II and the state III), the packets transmitted from the mobile node 100 of FIG. 1 toward the correspondent node 51 of FIG. 1, that is the destination thereof, are buffered in the queue 131a of FIG. 2 and then transmitted to the destination node after transition to the state IV (after the default router is changed).

As described above, according to the packet communication system 1 of the first embodiment, the mobile node 100 of FIG. 1 performs buffering of the packets into the respective queues 131a, 131b, and 131c of FIG. 2 individually provided depending on the addresses of the correspondent nodes 51, 52 and 53 of FIG. 1 that are the destination thereof. Along with the release of buffering, the mobile node 100 of FIG. 1 first transmits only one front packet out of the packets buffered in each queue to the desired correspondent node. Then, after a lapse of a given time period (such as 15 ms), the mobile node 100 of FIG. 1 transmits the remaining packets continuously.

In this way, the front packet reaches the correspondent node of the destination while facilitating the resolution of the MAC address by the router, which has an unresolved MAC address, existing on the transmission pathway. After a lapse of the given time period, the remaining packets are routed through the same pathway as that for the front packet. However, a router having an unresolved MAC address no longer exists on that pathway. Therefore, the remaining packets will be neither replaced by subsequent packets nor discarded. As a result, packet losses are reduced and the plurality of packets certainly reach the destination. In addition, a rate of retransmission of the packets is reduced, and the network resources can be more efficiently utilized.

Second Embodiment

Next, a second embodiment of the present invention is described in detail with reference to the accompanying drawings.

As a premise, this embodiment is based on an assumption that the packet transmission control technique according to the present invention is adopted to a mobility agent (MA).

Figure 5:
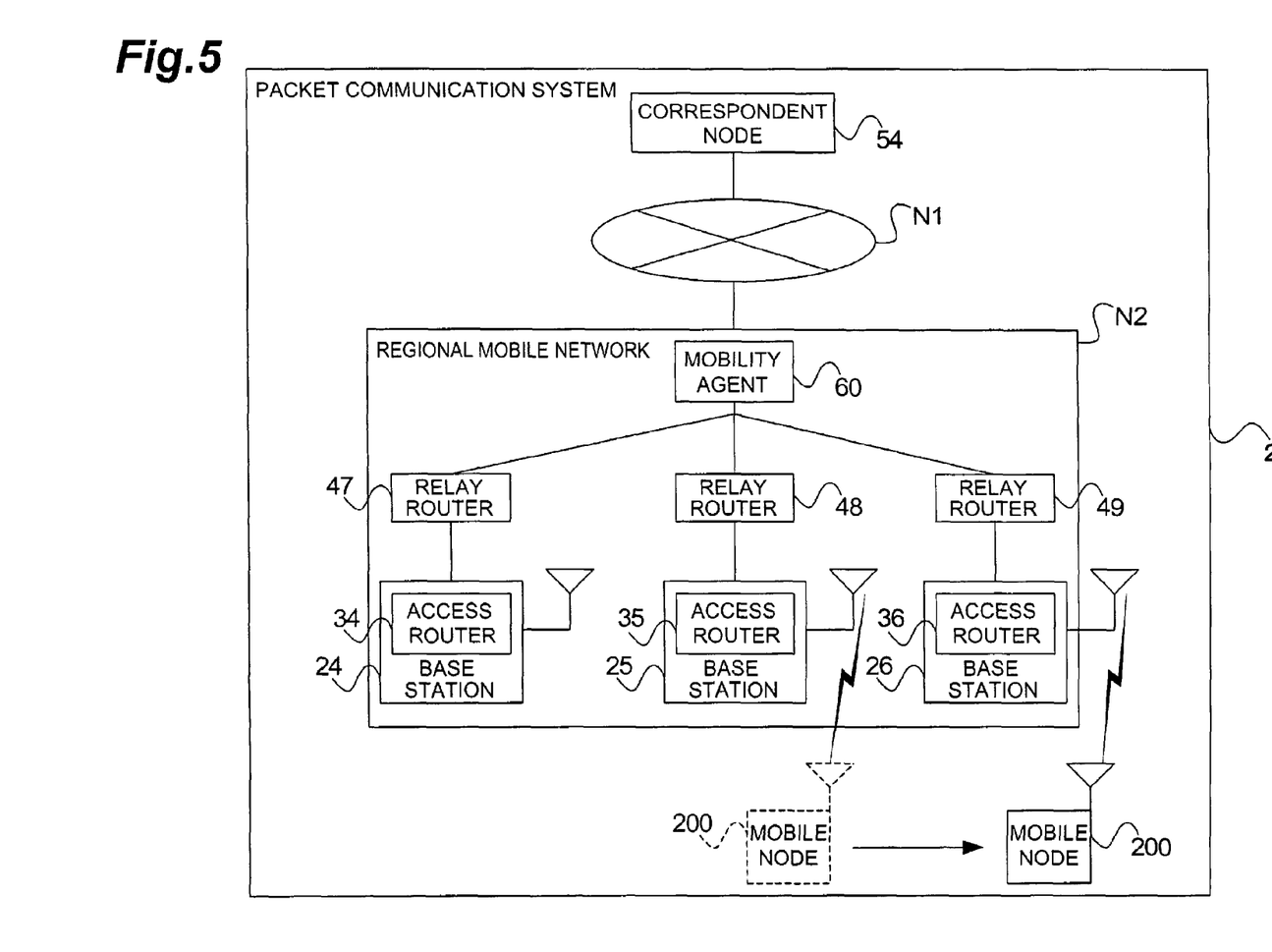
FIG. 5 is a block diagram showing an overall configuration of a packet communication system according to a second embodiment.

FIG. 5 is a block diagram showing an overall configuration of a packet communication system according to this embodiment. A packet communication system 2 shown in FIG. 5 is configured by including a mobile node (MN) 200 such as a mobile telephone, a regional mobile network N2, a known backbone network N1, and one correspondent node (CN) 54.

The regional mobile network N2 is constituted by wire connection of access routers (AR) 34, 35, and 36 respectively provided in a plurality of base stations 24, 25, and 26, relay routers 47 to 49 connected directly to these access routers 34 to 36, and one mobility agent 60. Moreover, the regional mobile network N2 is connected to the correspondent node 54 by wire through the backbone network N1.

The mobile node 200 is wirelessly connected to any one of the access routers 34 to 36 depending on the location of mobile node 200, and is handed over between the access routers 35 and 36 while receiving packets from the correspondent node 54.

The access routers 34 to 36 and the relay routers 47 to 49 (herein after collectively referred to as the "routers") execute resolution processing of a MAC address in order to specify a router as a subsequent routing destination of the packets.

The mobility agent 60 is a node which receives the packets transmitted from the correspondent node 54 addressed to the mobile node 200 and transmits the packets to the access router currently connected to the mobile node 200. Here, for each of the relay routers and the access routers through which the packets pass through after transmitted until received, a time period required to resolve the MAC address of the node that is the subsequent routing destination of the packets is preferably set to about 5 ms (corresponding to a first time period).

The packets, which are transmitted from an apparatus after the backbone network N1 (such as the correspondent node 54) to the mobile node 200 currently connected to the access router 35, reach the mobile node 200 through the mobility agent 60, the relay router 48 or 49, and the access router 35 or 36.

In this event, if there is no router having an unresolved MAC address after the backbone network N1, then the packets will be routed through up to three routers having unresolved MAC addresses (including the mobility agent 60)before reaching the mobile node 200. Therefore, as a transmission standby time period (corresponding to a second time period), 5 ms×3=15 ms is preferably preset on the mobility agent node 60.

Figure 6:
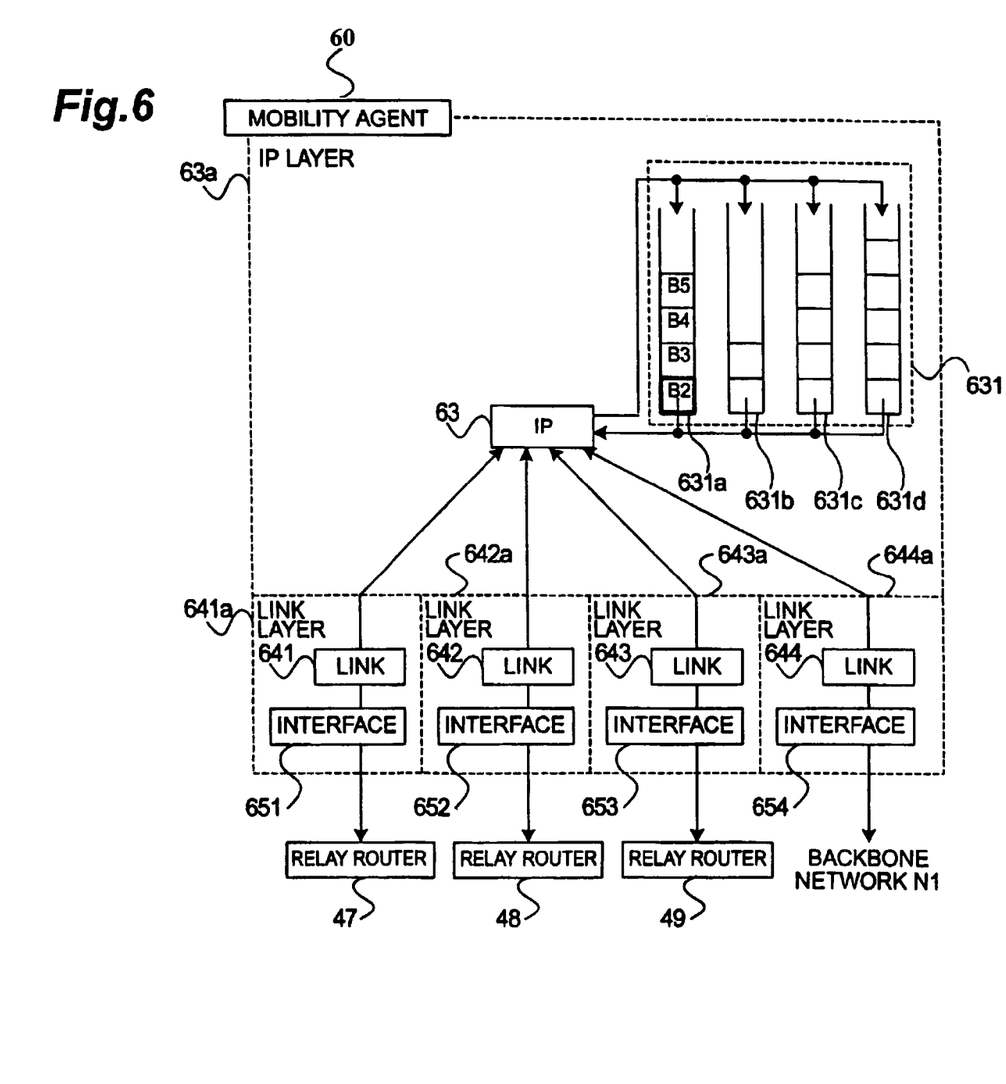
FIG. 6 is a conceptual view for explaining a functional constitution and operations of a mobility agent according to the second embodiment.

FIG. 6 is a conceptual view for explaining a functional constitution and operations of the mobility agent. As shown in FIG. 6, the mobility agent 60 includes an IP 63 (corresponding to packet transmission controlling means) having a buffer area 631 (corresponding to packet accumulating means) in an IP layer 63a, and links 641 to 644 as well as interfaces 651 to 654 in link layers 641a to 644a. The packets received by the IP 63 through the link layer 644a having the link 644 connected to the backbone network N1 are sorted to be transmitted to an appropriate link (any one of the links 641 to 643) in accordance with a routing table (not shown) possessed by the IP 63.

Upon receipt of a buffering request transmitted from the mobile node 200 of FIG. 5 through any of the links 641 to 643, the IP 63 buffers the packets addressed to the mobile node 200 of FIG. 5 in a corresponding queue (a queue 631a in this case) within the buffer area. Such buffering is continued until the IP 63 receives a buffering release request which is transmitted from the mobile node 200 of FIG. 5 through any one of the links 641 to 643.

Along with receipt of the buffering release request, the IP 63 hands over only one front packet (a packet B2) retained in the queue 631a to the appropriate link layer 643a in accordance with the routing table described earlier. Then, after a standby for 15 ms, the IP 63 hands over the remaining packets (packets B3 to B5 except the front packet) retained in the queue 631a to the appropriate link layer 643a.

Figure 7:
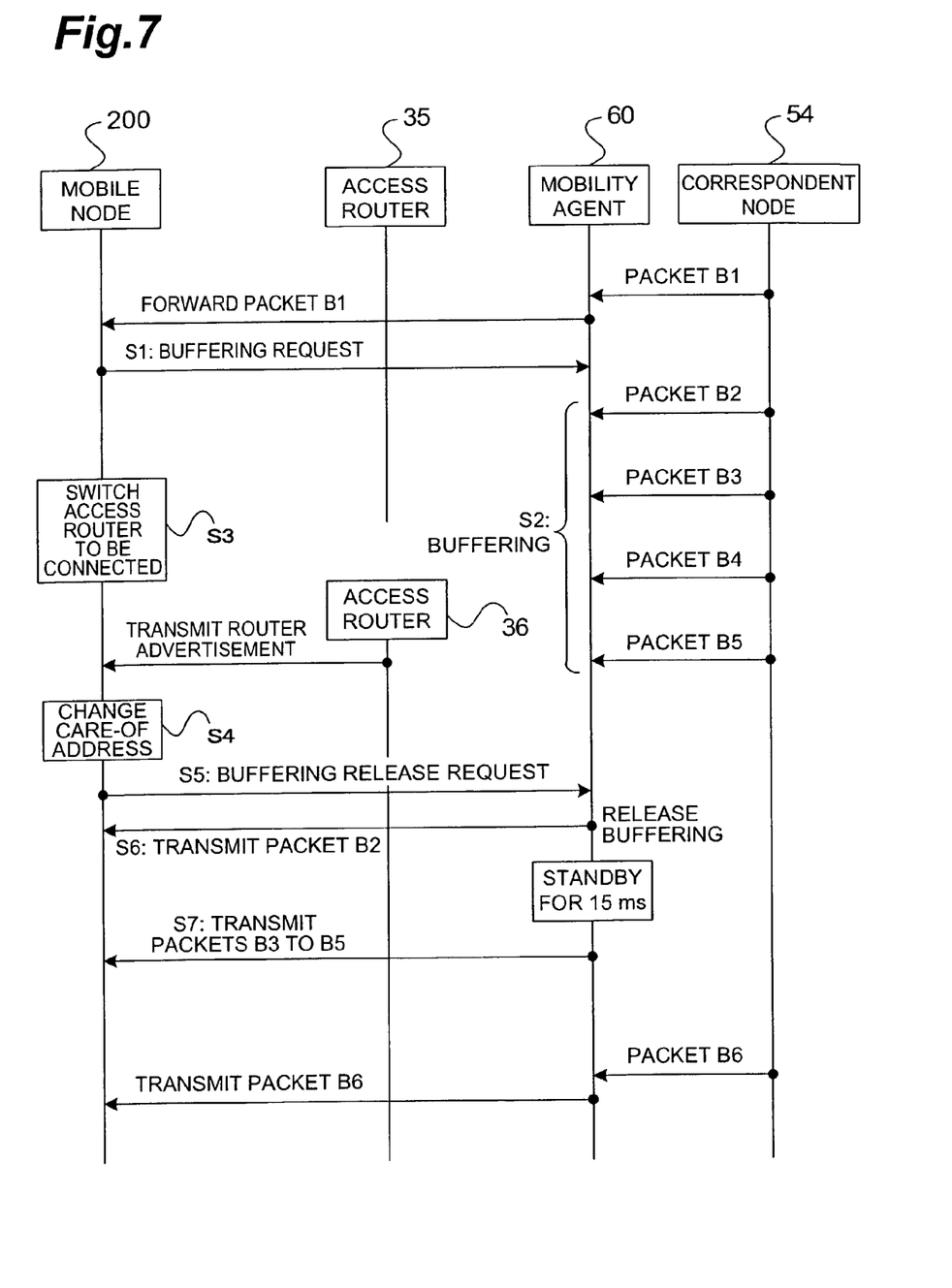
FIG. 7 is a view showing state transition in the event of a handover of a mobile node in the second embodiment.

FIG. 7 is a view showing state transition in the event of a handover of the mobile node 200 shown in the FIG. 5. Prior to transmission of the buffering request from the mobile node 200, the packet B1 is transmitted from the correspondent node 54 to the mobile node 200 through the mobility agent 60. In this event, the buffering request (S1) is transmitted from the mobile node 200 to the mobility agent 60.

This buffering request is transmitted prior to switching an access router to be connected. When the buffering request is transmitted by the mobile node 200, buffering of the packets B2 to B5 (S2) addressed to the mobile node 200 in the queue 631a of FIG. 6 is started.

When the access router to be connected is switched by the mobile node 200 (S3), a router advertisement (RA) from the switched access router 36 is received by the mobile node 200. Upon receipt of the RA, a care-of address is changed (S4).

When switching the access router to be connected is completed, the buffering release request (S5) is transmitted from the mobile node 200 to the mobility agent 60. Buffering is released when the buffering release request is received by the mobility agent 60. However, all the packets B2 to B5 buffered in the queue 631a of FIG. 6 at the point are not necessarily transmitted continuously to the mobile node 200 at equal intervals.

That is to say, when receipt of the buffering release request is detected, the front packet B2 among the four packets B2 to B5 buffered in the queue 631a is first transmitted (S6) to the mobile node 200. Then, after 15 ms have passed, the remaining packets B3 to B5 are continuously transmitted (S7) to the mobile node 200 by the mobility agent 60.

Note that this embodiment has been typically described regarding transmission control of the packets retained in the queue 631a that are addressed to the mobile node 200. However, regarding packets addressed to other mobile nodes (not shown) to be retained in the queues 631b to 631d apart from the queue 631a, similar processing is also performed in each of the queues and the mobile nodes.

The packet communication system of the second embodiment is, as hitherto described, an example of adopting the mobility agent 60 as the packet transmission control device according to the present invention. The mobility agent 60 performs buffering of the packets in the queues individually provided for each of the addresses of the mobile nodes, i.e., the destinations of the packets. Along with the release of buffering, the mobility agent 60 transmits only one front packet among the packets buffered in each queue to the desired mobile node 200. Then, after a lapse of a given time period (such as 15 ms), the mobility agent 60 transmits the remaining packets continuously.

In this way, the one front packet reaches the correspondent node of the destination while facilitating the resolution of the MAC address by the router, which has an unresolved MAC address, existing on the transmission pathway. After a lapse of the given time period, the remaining packets are routed on the same pathway as that for the front packet. However, a router having an unresolved MAC address no longer exists on that pathway. Therefore, the remaining packets will neither be replaced by subsequent packets nor discarded. As a result, packet losses are reduced and the plurality of packets certainly reach the destination. In addition, a rate of retransmission of the packets is reduced, and the network resources can be more efficiently utilized.

It is to be noted that the aspects described in the respective embodiments are preferred examples of the packet communication system according to the present invention. Accordingly, the present invention is not limited to the aspects described herein.

For example, in each of the foregoing embodiments, descriptions have been made regarding the examples in which the control technique for packet transmission according to the present invention is applied to the mobile node and the mobility agent. However, without limiting to these nodes, the above control technique is also applicable to other communication apparatuses such as a router for transmitting a plurality of packets to a desired destination node.

Moreover, in each of the foregoing embodiments, a description has been made regarding the control technique for packet transmission in the event of the release of buffering. However, the above-described control technique is also applicable to the case where the application requires packet transmission at a shorter transmission interval.

Furthermore, in each of the foregoing embodiments, descriptions have been made based on the assumption that the mobile node is a mobile telephone. However, the mobile node may be any information equipment having a wireless communication function, such as a personal digital assistance (PDA).

Lastly, a description is provided concerning a program for achieving the packet transmission control technique according to the present invention, and a computer-readable recording medium which records the program (hereinafter simply referred to as the "recording medium"). The recording medium is designed to impart a state of energy changes in magnetism, light, electricity or the like, to a reading apparatus provided on hardware resources such as a general-purpose computer, in response to the contents of description of the program. Moreover, the recording medium is designed to be capable of transmitting the contents of description of the program to the reading apparatus in the form of signals corresponding to the energy changes. This type of recording medium may be one detachably fitted to a computer (including a mobile terminal), for example: an IC card such as a user identification module (UIM); a magnetic disk; an optical disk; or a magneto-optical disk. In addition, the recording medium may be a nonvolatile semiconductor memory such as a hard disk (HD) fixedly built in the computer or integrally fixed firmware.

Moreover, the above program may have a constitution in which communicating means provided in a wireless control apparatus according to the present invention receives and records the program either partially or entirely, from another instrument, through a transmission medium such as a communication line. On the contrary, the above program may have a constitution in which the program is transmitted from the wireless control apparatus according to the present invention through the transmission medium, to another instrument to be installed.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A packet transmission control apparatus which serially transmits a plurality of packets addressed to a destination node at intervals of a first time period, comprising:
    a packet accumulating unit configured to buffer a plurality of packets; and
    a packet transmission controlling unit configured to transmit, to a destination node, a front packet included in the plurality of packets buffered in the packet accumulating unit and transmit remaining packets included in the plurality of packets, in serial fashion at intervals of the first time period to the destination node after a lapse of a second time period, the second time period commencing at the start of transmission of the front packet, the first time period is a time period necessary for a node to resolve a MAC address of a routing destination of the packet, the node relaying the packet transmitted by the packet transmission control apparatus, the second time period is a time period necessary for all nodes, which are to resolve the MAC address, to resolve the MAC address, the nodes being among nodes which the plurality of packets transmitted from the packet transmission control apparatus pass through before reaching the destination node.

2. A mobile node which serially transmits a plurality of packets addressed to a destination node at intervals of a first time period, comprising:
    a controller segmenting operation into service layers;
    a link layer of the controller configured to switch a connection from a first access router to a second access router; and
    an IP layer of the controller configured to control sequential transmission of a plurality of packets to the destination node through the second access router,
    wherein the IP layer includes a buffer area in which the plurality of packets are buffered in a disconnection period when the mobile node switches the connection from the first access router to the second access router,
    the IP layer is configured to perform control of transmitting a front packet included in the plurality of packets buffered in the buffer area to the second access router, and of transmitting remaining packets included in the plurality of packets, the serial fashion at intervals of the first time period to the second access router after a lapse of a second time period, the second time period commencing at the start of transmission of the front packet, the first time period is a time period necessary for any of the switched access routers and a node for relaying the packet transmitted by the mobile node, to resolve a MAC address of a routing destination of the packet, the node relaying the packet transmitted by the mobile node, the second time period is a time period necessary for all nodes, which are to resolve the MAC address, to resolve the MAC address, the nodes being among nodes which the plurality of packets transmitted from a packet transmission control apparatus pass through before reaching the destination node.

3. A control node which serially transmits a plurality of packets addressed to a destination node at intervals of a first time period, comprising:
    an IP layer configured to control sequential transmission of a plurality of packets to a mobile node through a router, the IP layer includes a buffer area in which the plurality of packets are buffered in response to a buffering request from the mobile node,
    the IP layer is configured to control transmission of a front packet included in the plurality of packets buffered in the buffer area to the mobile node in response to a buffering release request from the mobile node, and transmission of remaining packets included in the plurality of packets, in serial fashion at intervals of the first time period to the mobile node after a lapse of a second time period the second time period commencing at the start of transmission of the front packet, the first time period is a time period necessary for a node to resolve a MAC address of a routing destination of the packet, the node relaying the packet transmitted by the control node, the second time period is a time period necessary for all nodes, which are to resolve the MAC address, to resolve the MAC address, the nodes being among nodes which the plurality of packets transmitted from a packet transmission control apparatus pass through before reaching the destination node.

4. A packet communication method for allowing a packet transmission control apparatus to sequentially transmit a plurality of packets addressed to a destination node at intervals of a first time period, the method comprising:
    transmitting, to the destination node, a front packet included in the plurality of packets buffered in a packet accumulating unit; and transmitting remaining packets included in the plurality of packets, in serial fashion at intervals of the first time period to the destination node after a lapse of a second time period the second time period commencing at the start of transmission of the front packet, the first time period is a time period necessary for a node to resolve a MAC address of a routing destination of the packet, the node relaying the packet transmitted by the packet transmission control apparatus, the second time period is a time period necessary for all nodes, which are to resolve the MAC address, to resolve the MAC address, the nodes being among nodes which the plurality of packets transmitted from the packet transmission control apparatus pass through before reaching the destination node.

5. A packet communication method for allowing a mobile node to sequentially transmit a plurality of packets to a destination node which serially transmits a plurality of packets addressed to a destination node at intervals of a first time period, the method comprising:

switching a mobile node connection from a first access router to a second access router;

transmitting, to the second access router, a front packet included in the plurality of packets buffered in a packet accumulating unit during a disconnection period when the mobile node switches from the first access router to the second access router; and transmitting remaining packets included in the plurality of packets, in serial fashion at intervals of the first time period, to the second access router after a lapse of a second time period the second time period commencing at the start of transmission of the front packet, the first time period is a time period necessary for any of the switched access routers and a node for relaying the packet transmitted by the mobile node, to resolve a MAC address of a routing destination of the packet, the node relaying the packet transmitted by the mobile node, the second time period is a time period necessary for all nodes, which are to resolve the MAC address, to resolve the MAC address, the nodes being among nodes which the plurality of packets transmitted from a packet transmission control apparatus pass through before reaching the destination node.

6. A packet communication method for allowing a control node to sequentially transmit a plurality of packets to a mobile node through a router which serially transmits a plurality of packets addressed to a destination node at intervals of a first time period, the method comprising:

buffering in a packet accumulating unit the plurality of packets in response to a buffering request from the mobile node, transmitting, to the mobile node, a front packet included in the plurality of packets buffered in the packet accumulating unit in response to a buffering release request from the mobile node; and transmitting remaining packets included in the plurality of packets in serial fashion at intervals of the first time period, to the mobile node after a lapse of a second time period the second time period commencing at the start of transmission of the front packet, the first time period is a time period necessary for a node to resolve a MAC address of a routing destination of the packet, the node relaying the packet transmitted by the control node, the second time period is a time period necessary for all nodes, which are to resolve the MAC address, to resolve the MAC address, the nodes being among nodes which the plurality of packets transmitted from a packet transmission control apparatus pass through before reaching the destination node.

7. A packet communication system comprising:
the packet transmission control apparatus according to claim 1; and
a destination node for receiving the plurality of packets transmitted from the packet transmission control apparatus.

8. A packet communication system comprising:
the mobile node according to claim 2; and
a destination node for receiving the plurality of packets transmitted from the mobile node through an access router.

9. A packet communication system comprising:
the control node according to claim 3; and
a mobile node for receiving the plurality of packets transmitted from the control node through a router.

10. The apparatus according to claim 1, wherein when the front packet is buffered in the packet accumulating unit, the front packet is transmitted from the packet accumulating unit within an interval less than or equal to the predetermined downstream front packet processing time period.

11. The apparatus according to claim 1, wherein when the front packet is buffered in the IP layer, the front packet is transmitted from the packet accumulating unit within an interval less than or equal to the predetermined downstream front packet processing time period.

12. The apparatus according to claim 3, wherein when the front packet is buffered in the IP layer, the front packet is transmitted from the buffer area within an interval less than or equal to the predetermined downstream front packet processing time period.

13. The method according to claim 4, wherein when the front packet is buffered in the packet accumulating unit, the front packet is transmitted from the packet accumulating unit within an interval less than or equal to the predetermined downstream front packet processing time period.

14. The method according to claim 5, wherein when the front packet is buffered in the packet accumulating unit, the front packet is transmitted from the packet accumulating unit within an interval less than or equal to the predetermined downstream front packet processing time period.

15. The method according to claim 6, wherein when the front packet is buffered in the packet accumulating unit, the front packet is transmitted from the packet accumulating unit within an interval less than or equal to the predetermined downstream front packet processing time period.

* * * * *